H. & G. W. Packer,
Wash Boiler.
No. 96,473. Patented Nov. 2, 1869.
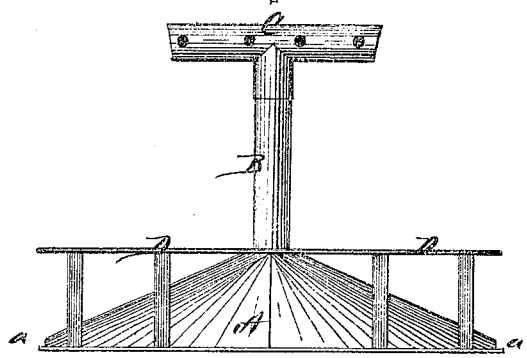
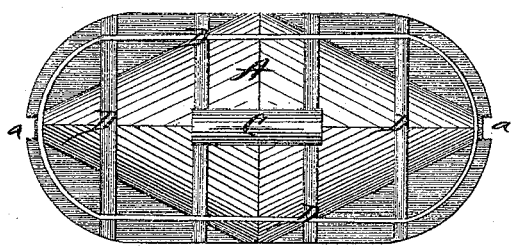
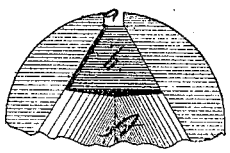
Witnesses  
J. Lehmann  
C. L. Evert
Inventors  
H. Packer  
G. W. Packer  
per Alexander Mason  
Attys.

United States Patent Office.

H. PACKER AND G. W. PACKER, OF SANDWICH, ILLINOIS.

Letters Patent No. 96,473, dated November 2, 1869.

IMPROVED WASH-BOILER.

The Schedule referred to in these Letters Patent and making part of the same.

*To all whom it may concern:*

Be it known that we, H. PACKER and G. W. PACKER, of Sandwich, in the county of De Kalb, and in the State of Illinois, have invented certain new and useful Improvements in Wash-Boilers; and do hereby declare that the following is a full, clear, and exact description thereof, reference being had to the accompanying drawings, and to the letters of reference marked thereon, making a part of this specification.

The nature of our invention consists in the construction and general arrangement of a steam clothes-washer, to be placed inside of a wash-boiler.

In order to enable others skilled in the art to which our invention appertains, to make and use the same, we will now proceed to describe its construction and operation, referring to the annexed drawings, in which—

Figure 1 is a side elevation, and

Figure 2, a plan view of our invention.

Figure 3 is a bottom view of one end of the same.

A represents a diamond or cone-shaped bottom, having an upright tube, B, in the centre, of suitable height.

At the upper end of the tube B is a horizontal tube, C, the sides and ends of which are perforated with a number of holes, distributing the water equally over the entire surface of the clothes.

On the upper side of the bottom A is erected an open rack, D, to rest the clothes upon, and keep them entirely above the water, thus forcing the water to pass entirely through the clothes in passing back to the bottom. Also giving the steam from the water under the rack a chance to act on the clothes.

At its ends, the bottom A is cut with notches or openings *a a*, so as to allow the water to pass back under the bottom.

Near these openings *a a*, in the bottom A, are placed three-cornered pieces *b b*, to prevent the water from escaping out of the apertures at the ends, as it otherwise would when it began to expand, instead of passing up the tube B.

Having thus fully described our invention,

What we claim as new, and desire to secure by Letters Patent, is—

The combination and arrangement of the bottom A, having notches *a a* and pieces *b b*, centre tube B, perforated tube or cylinder C, and rack D, all constructed as described, as and for the purposes herein set forth.

In testimony that we claim the foregoing, we have hereunto set our hands, this 21st day of August, 1869.

H. PACKER.
G. W. PACKER.

Witnesses:
W. W. SEDGWICK,
WILLIAM EMMONS.